(12) United States Patent
Sugano

(10) Patent No.: US 11,840,215 B2
(45) Date of Patent: *Dec. 12, 2023

(54) AUTOMATED VALET PARKING SYSTEM

(71) Applicant: Toyota Jidosha Kabushiki Kaisha, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 521 days.

This patent is subject to a terminal disclaimer.

(21) Appl. No.: 17/106,604

(22) Filed: Nov. 30, 2020

(65) Prior Publication Data

US 2021/0171020 A1 Jun. 10, 2021

(30) Foreign Application Priority Data

Dec. 6, 2019 (JP) .................. 2019-221289

(51) Int. Cl.
*B60W 30/06* (2006.01)
*B60W 50/02* (2012.01)

(52) U.S. Cl.
CPC ........ *B60W 30/06* (2013.01); *B60W 50/0205* (2013.01); *B60W 50/0225* (2013.01);
(Continued)

(58) Field of Classification Search
CPC ............. B60W 30/06; B60W 50/0205; B60W 50/0225; B60W 2050/021;
(Continued)

(56) References Cited

U.S. PATENT DOCUMENTS 6,904,362 B2 6/2005 Nakashima et al.
11,250,706 B2 2/2022 Hüger et al.
(Continued)

FOREIGN PATENT DOCUMENTS

CN 107238814 A 10/2017
CN 110304049 A 10/2019
(Continued)

OTHER PUBLICATIONS

U.S. Appl. No. 17/015,576, filed Sep. 9, 2020 Inventor: Tatsuya Sugano.
(Continued)

*Primary Examiner* — Daryl C Pope
(74) *Attorney, Agent, or Firm* — Dinsmore & Shohl LLP

(57) ABSTRACT

An automated valet parking system is configured to acquire a first vehicle position, and acquire a second vehicle position, and determine whether a position failure about the first vehicle position of an autonomous vehicle is. The first vehicle position includes a first longitudinal position and a first lateral position, the second vehicle position includes a second longitudinal position and a second lateral position, and a longitudinal threshold is smaller than a lateral threshold. The automated valet parking system is configured to determine that the position failure is in at least one of a case where a difference between the first longitudinal position and the second longitudinal position is equal to or larger than the longitudinal threshold, and a case where a difference between the first lateral position and the second lateral position is equal to or larger than the lateral threshold.

10 Claims, 8 Drawing Sheets

(52) U.S. Cl.
CPC ............... *B60W 2050/021* (2013.01); *B60W 2050/0215* (2013.01)

(58) Field of Classification Search
CPC ....... B60W 2050/0215; B62D 15/0285; G08G 1/14; G08G 1/123
See application file for complete search history.

(56) References Cited

U.S. PATENT DOCUMENTS

| | | | |
|---|---|---|---|
| 11,628,830 B2* | 4/2023 | Sugano | B60W 30/06 |
| | | | 340/932.2 |
| 2006/0047423 A1* | 3/2006 | Min | G01C 21/30 |
| | | | 340/995.19 |
| 2019/0337513 A1 | 11/2019 | Kim | |
| 2019/0382002 A1* | 12/2019 | Yamazaki | G05D 1/0297 |
| 2020/0166350 A1 | 5/2020 | Gitz et al. | |
| 2020/0307648 A1 | 10/2020 | Noguchi et al. | |
| 2020/0385016 A1 | 12/2020 | Noguchi et al. | |
| 2021/0078601 A1 | 3/2021 | Sugano | |
| 2021/0086759 A1 | 3/2021 | Yamanaka et al. | |
| 2021/0171019 A1 | 6/2021 | Sugano | |
| 2021/0033166 A1 | 10/2021 | Meng et al. | |
| 2021/0331666 A1* | 10/2021 | Meng | G08G 1/096708 |
| 2022/0135024 A1* | 5/2022 | Hidaka | G08G 1/00 |
| | | | 701/23 |
| 2022/0172623 A1 | 6/2022 | Hidaka et al. | |

FOREIGN PATENT DOCUMENTS

| | | |
|---|---|---|
| EP | 0466348 A1 | 12/1994 |
| JP | 2018-021777 A | 2/2018 |
| JP | 2018-147477 A | 9/2018 |
| TH | 1801006636 A | 8/2019 |
| WO | 2018163817 A1 | 9/2018 |

OTHER PUBLICATIONS

U.S. Office Action dated Oct. 31, 2022 to U.S. Appl. No. 17/015,576, filed Sep. 9, 2020.

Notice of Allowance dated Feb. 8, 2023 to U.S. Appl. No. 17/015,576, filed Sep. 9, 2020.

* cited by examiner

AUTOMATED VALET PARKING SYSTEM

CROSS REFERENCE TO RELATED APPLICATION

This application claims priority to Japanese Patent Application No. 2019-221289 filed on Dec. 6, 2019, the content of which is incorporated herein by reference in its entirety.

BACKGROUND

1. Technical Field

The disclosure relates to automated valet parking systems.

2. Description of Related Art

Japanese Unexamined Patent Application Publication No. 2018-21777 (JP 2018-21777 A) is known as a technical document relating to an autonomous vehicle. This technical document describes that the vehicle position, which is the position of a vehicle on a map, is estimated using the position of a landmark captured by a camera mounted on the vehicle relative to the vehicle and position information of the landmark on the map.

SUMMARY

Automated valet parking for autonomous vehicles normally uses the vehicle position acquired using an on-board sensor mounted on the autonomous vehicle. However, a problem may occur when there is an error in vehicle position due to, e.g., an error of the on-board sensor etc.

A first aspect of the disclosure is an automated valet parking system configured to instruct an autonomous vehicle in a parking place to automatically move along an aisle in the parking place and park in a desired parking space in the parking place. The automated valet parking system includes: a first vehicle position acquisition unit configured to acquire a first vehicle position that is a position of the autonomous vehicle on a parking place map based on a detection result of an on-board sensor of the autonomous vehicle and parking place map information including object information in the parking place; a second vehicle position acquisition unit configured to acquire a second vehicle position that is a position of the autonomous vehicle on the parking place map, based on a detection result of a facility sensor installed in the parking place; and a position failure determination unit configured to determine whether a position failure about the first vehicle position of the autonomous vehicle is based on the first vehicle position and the second vehicle position. The first vehicle position includes a first longitudinal position along an extending direction in which the aisle extends and a first lateral position along a lateral direction of the aisle, and the second vehicle position includes a second longitudinal position along the extending direction and a second lateral position along the lateral direction of the aisle. The position failure determination unit is configured to determine that the position failure is in at least one of a case where a difference between the first longitudinal position and the second longitudinal position is equal to or larger than a longitudinal threshold, and a case where a difference between the first lateral position and the second lateral position is equal to or larger than a lateral threshold. The longitudinal threshold is smaller than the lateral threshold.

According to the above aspect, the position failure determination unit is configured to determine that the position failure is in at least one of the case where the difference between the first longitudinal position and the second longitudinal position is equal to or larger than the longitudinal threshold, and the case where the difference between the first lateral position and the second lateral position is equal to or larger than the lateral threshold. The longitudinal threshold smaller than the lateral threshold is used to determine whether there is the position failure. Accordingly, whether there is the position failure in the vehicle position based on the detection result of the on-board sensor of the autonomous vehicle can be appropriately determined regarding the direction in which the aisle extends.

In the first aspect, the parking place map information may include aisle width information regarding a width of the aisle, the position failure determination unit may be configured to determine whether the position failure is by using a first lateral threshold as the lateral threshold when a width of the aisle along which the autonomous vehicle is moving is equal to or larger than an aisle width threshold, and the first lateral threshold may be larger than a second lateral threshold that is used when the width of the aisle along which the autonomous vehicle is moving is smaller than the aisle width threshold.

According to the above configuration, whether there is the position failure in the lateral position can be determined according to the aisle width.

In the first aspect, the parking place map information may include node position information regarding a plurality of nodes that is preset for a plurality of the aisles so as to be separated at predetermined intervals. The position failure determination unit may be configured to determine whether the position failure is by using a first longitudinal threshold as the longitudinal threshold when a node interval between the nodes on the aisle along which the autonomous vehicle is moving is equal to or larger than a node interval threshold. The first longitudinal threshold may be larger than a second longitudinal threshold that is used when the node interval is smaller than the node interval threshold.

According to the above configuration, whether there is the position failure in the longitudinal position can be determined according to the node interval.

In the first aspect, the parking place map information may include node position information regarding a plurality of nodes that is preset for a plurality of the aisles so as to be separated at the predetermined intervals and node label information regarding types of the nodes. The node label information may include a node type indicating that a node is located near a parking section. The position failure determination unit may be configured to determine whether the position failure is by using a first longitudinal threshold as the longitudinal threshold is when the node near the moving autonomous vehicle is located near the parking section. The first longitudinal threshold may be smaller than a second longitudinal threshold that is used when the node is not located near the parking section.

According to the above configuration, whether there is the position failure in the longitudinal direction can be determined according to whether the node is located near the parking section.

A second aspect of the disclosure is an automated valet parking system including a controller. The controller is configured to: instruct an autonomous vehicle in a parking place to automatically move along an aisle in the parking place and park in a desired parking space in the parking place; acquire a first vehicle position that is a position of the autonomous vehicle on a parking place map based on a detection result of an on-board sensor of the autonomous vehicle and parking place map information including object information in the parking place; acquire a second vehicle position that is a position of the autonomous vehicle on the parking place map based on a detection result of a facility sensor installed in the parking place; and determine whether a position failure about the first vehicle position of the autonomous vehicle is based on the first vehicle position and the second vehicle position. The first vehicle position includes a first longitudinal position along an extending direction in which the aisle extends and a first lateral position along a lateral direction of the aisle, and the second vehicle position includes a second longitudinal position along the extending direction and a second lateral position along the lateral direction of the aisle. The controller is configured to determine that the position failure is in at least one of a case where a difference between the first longitudinal position and the second longitudinal position is equal to or larger than a longitudinal threshold, and a case where a difference between the first lateral position and the second lateral position is equal to or larger than a lateral threshold. The longitudinal threshold is smaller than the lateral threshold.

In the second aspect, the parking place map information may include aisle width information regarding a width of the aisle, the controller may be configured to determine whether the position failure is by using a first lateral threshold as the lateral threshold when the width of the aisle along which the autonomous vehicle is moving is equal to or larger than an aisle width threshold, and the first lateral threshold may be larger than a second lateral threshold that is used when a width of the aisle along which the autonomous vehicle is moving is smaller than the aisle width threshold.

In the second aspect, the parking place map information may include node position information regarding a plurality of nodes that is preset for a plurality of the aisles so as to be separated at predetermined intervals. The controller may be configured to determine whether the position failure is by using a first longitudinal threshold as the longitudinal threshold when a node interval between adjacent ones of the nodes on the aisle along which the autonomous vehicle is moving is equal to or larger than a node interval threshold, and the first longitudinal threshold may be larger than a second longitudinal threshold that is used when the node interval is smaller than the node interval threshold.

In the second aspect, the parking place map information may include node position information regarding a plurality of nodes that is preset for a plurality of the aisles so as to be separated at predetermined intervals and node label information regarding types of the nodes, and the node label information may include a node type indicating that a node is located near a parking section. The controller may be configured to determine whether the position failure is by using a first longitudinal threshold as the longitudinal threshold when the node near the moving autonomous vehicle is located near the parking section, and the first longitudinal threshold may be smaller than a second longitudinal threshold that is used when the node is not located near the parking section.

According to the first and second aspects of the disclosure, whether there is the position failure in the vehicle position based on the detection result of the on-board sensor of the autonomous vehicle can be appropriately determined regarding the direction in which the aisle extends.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

An embodiment of the disclosure will be described with reference to the accompanying drawings.

Figure 1:
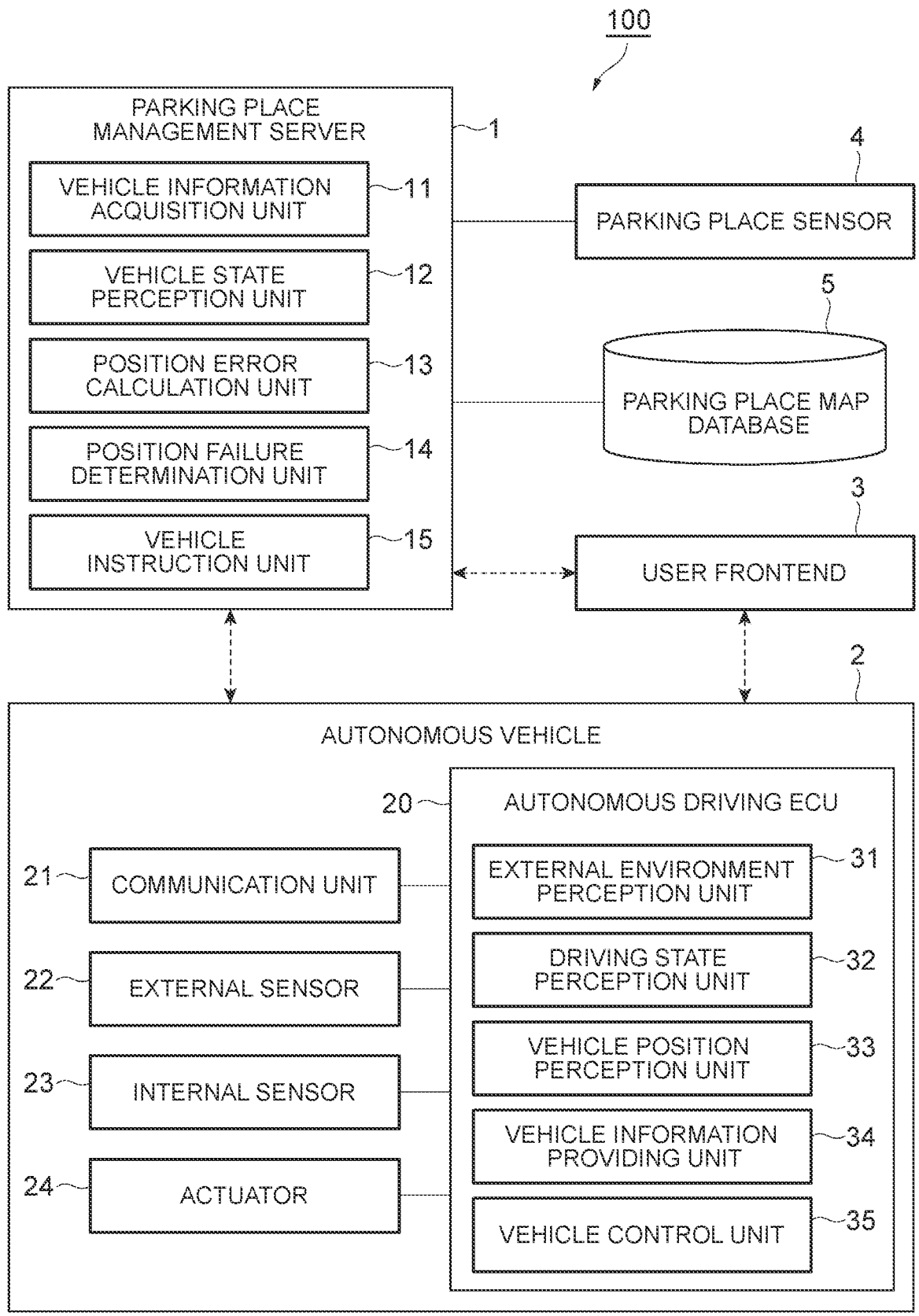
FIG. 1 is a block diagram of an automated valet parking system according to an embodiment.

FIG. 1 is a block diagram of an automated valet parking system (AVPS) 100 according to an embodiment. The automated valet parking system 100 shown in FIG. 1 is a system for automated valet parking of an autonomous vehicle 2 in a parking place.

Automated valet parking is a service in which, after a user (occupants) leaves the autonomous vehicle 2 in a drop-off area in the parking place, the now driverless autonomous vehicle 2 moves along a desired route according to instructions from the parking place and automatically parks in a desired parking space in the parking place. The desired parking space is a parking space preset as a parking position of the autonomous vehicle 2. The desired route is a route in the parking place along which the autonomous vehicle 2 moves to reach the desired parking space. For picking up the autonomous vehicle 2, the desired route is a route along which the autonomous vehicle 2 moves to reach a pick-up space described later.

The parking place may be a parking place exclusively for automated valet parking or may be a parking place for both automated valet parking and general vehicles that are not for automated valet parking. A part of a parking place for general vehicles may be used as an area exclusively for automated valet parking. In the present embodiment, a parking place exclusively for automated valet parking will be described as an example.

Figure 2:
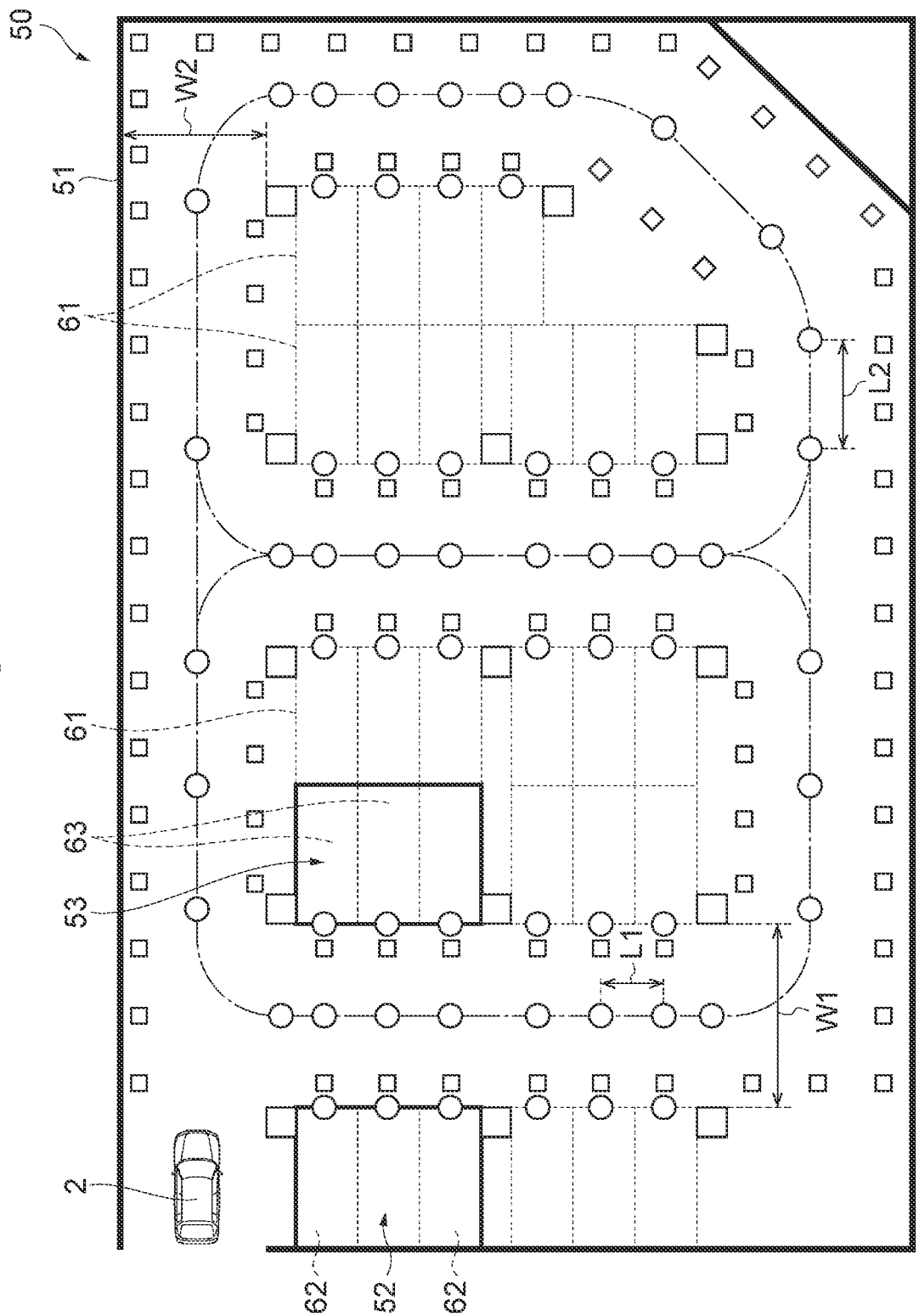
FIG. 2 is a plan view illustrating an example of a parking place for automated valet parking.

FIG. 2 is a plan view illustrating an example of a parking place for automated valet parking. FIG. 2 shows a parking place 50 for automated valet parking, a parking area 51, a drop-off area 52, and a pick-up area 53. The parking place 50 includes the parking area 51, the drop-off area 52, and the pick-up area 53. The drop-off area 52 and the pick-up area 53 do not have to be separate areas and may be a single drop-off and pick-up area.

The parking area 51 is a place having parking spaces (parking slots) 61 where the autonomous vehicle 2 parks by automated valet parking. As shown in, e.g., FIG. 2, the plurality of parking spaces 61 is located next to each other in one direction (the lateral direction of parked vehicles). The drop-off area 52 is a place where the occupants including the user drop off the autonomous vehicle 2 for automated valet parking. The drop-off area 52 is located near the entrance/exit of the parking place 50 and has drop-off spaces 62 where the autonomous vehicle 2 stops when the occupants get out of the autonomous vehicle 2.

The pick-up area 53 is a place where the occupants pick up the autonomous vehicle 2. The pick-up area 53 is located near the entrance/exit of the parking place 50 and has pick-up spaces 63 where the autonomous vehicle 2 waits until the occupants get in the autonomous vehicle 2.

For example, after the autonomous vehicle 2 having entered the parking place 50 drops off the occupants in the drop-off space 62, the automated valet parking system 100 is given the authority to give instructions to the autonomous vehicle 2 and starts automated valet parking. The automated valet parking system 100 instructs the autonomous vehicle 2 to move toward a desired parking space in the parking area 51 and to park in the desired parking space. In response to a pick-up request, the automated valet parking system 100 instructs the parked autonomous vehicle 2 to move toward the pick-up area 53 and to wait in the pick-up space 63 until the occupants arrive.

When the autonomous vehicle 2 is moving toward the desired parking space in the parking area 51 by automated valet parking and when the autonomous vehicle 2 is moving toward the pick-up area 53 by automated valet parking, the automated valet parking system 100 determines whether there is a position failure of the autonomous vehicle 2, based on the detection result of an on-board sensor mounted on the autonomous vehicle 2 and the detection result of a parking place sensor (facility sensor) 4 installed in the parking place 50.

Configuration of Automated Valet Parking System

Next, the configuration of the automated valet parking system 100 will be described with reference to the drawings. As shown in FIG. 1, the automated valet parking system 100 includes a parking place management server 1. The parking place management server 1 is a server for managing the parking place.

The parking place management server 1 is configured to be able to communicate with the autonomous vehicle 2 and a user frontend 3. The autonomous vehicle 2 and the user frontend 3 will be described in detail later. The parking place management server 1 may be installed in the parking place or may be installed in a facility located away from the parking place. The parking place management server 1 may be composed of a plurality of computers provided in different places.

The parking place management server 1 is connected to the parking place sensor 4 and a parking place map database 5. The parking place sensor 4 is a parking place facility sensor (infrastructure sensor) installed in the parking place 50 in order to perceive the situation in the parking place 50. The parking place sensor 4 includes a vacancy sensor for detecting whether there is a parked vehicle in each parking space (whether each parking space is occupied or vacant).

The vacancy sensor may be installed in each parking space or may be installed on a ceiling etc. of the parking place 50 so that a single vacancy sensor can monitor a plurality of parking spaces. The configuration of the vacancy sensor is not particularly limited, and the vacancy sensor may have a well-known configuration. The vacancy sensor may be a pressure sensor, may be a radar sensor using radio waves or a sonar sensor, or may be a camera. The vacancy sensor sends detection information of a parked vehicle in the parking space to the parking place management server 1.

The parking place sensor 4 may include a surveillance camera for detecting the autonomous vehicle 2 moving on a driving aisle in the parking place 50. The surveillance camera is installed on the ceiling or a wall of the parking place 50 and captures an image of the moving autonomous vehicle 2. The surveillance camera sends the captured image to the parking place management server 1.

The parking place sensor 4 includes a vehicle position detection sensor for acquiring the position of the autonomous vehicle 2 on a parking place map. The vehicle position detection sensor includes at least one of a camera and a radar sensor. The camera is an imaging device that captures an image of the autonomous vehicle 2 in the parking place 50. For example, a plurality of the cameras is installed on the ceiling or walls of the parking place 50 so that the position of the autonomous vehicle 2 in the parking place 50 can be acquired, and the cameras capture an image of the moving autonomous vehicle 2. The surveillance camera described above may be substituted for the camera. The camera sends the captured image to the parking place management server 1. The radar sensor is a detection device that detects the autonomous vehicle 2 using radio waves (e.g., millimeter waves) or light. The radar sensor includes, e.g., a millimeter wave radar. The radar sensor detects the autonomous vehicle 2 by transmitting radio waves or light to an aisle in the parking place 50 and receiving the radio waves or light reflected by the autonomous vehicle 2. The radar sensor sends information on the detected autonomous vehicle 2 to the parking place management server 1. The radar sensor may include Light Detection and Ranging (LIDAR).

The parking place map database 5 is a database that stores parking place map information. The parking place map information includes position information of the parking spaces in the parking place, position information of the drop-off spaces, position information of the pick-up spaces, and information on driving aisles in the parking place. The parking place map information further includes node position information regarding a plurality of nodes that is preset for a plurality of aisles in the parking place, position information of driving boundaries that are used for autonomous driving of the autonomous vehicle 2, and position information (object information) of landmarks (features) that are used for position perception by the autonomous vehicle 2.

As used herein, the driving boundaries mean objects that can define the range in which the autonomous vehicle 2 can move by autonomous driving. The driving boundaries can be positions on objects fixedly placed in the parking place 50. The boundaries (e.g., a curb, a white line, etc.) between an aisle for the autonomous vehicle 2 and a sidewalk can also be used as the driving boundaries. For example, at least one of a predetermined position (e.g., a vertex) on the surface of a pillar in the parking place 50, a predetermined position on a wall surface in the parking place 50, a position where a pole is placed, a position where a safety cone is placed, a position where a road stud is placed, etc. can be used as the driving boundaries. The landmark means an object serving as a reference of a relative position that is used to perceive the position of the autonomous vehicle 2 in the parking place 50. An object fixedly placed in the parking place 50 can be used as the landmark. For example, at least one of a pillar in the parking place 50, a wall in the parking place 50, a pole, a safety cone, and a road stud is used as the landmark.

The parking place map information includes the node position information regarding the nodes that are preset for the aisles in the parking place 50 so as to be separated at predetermined intervals. In FIG. 2, the nodes preset for the aisles in the parking place 50 are shown by white circles. In the example of FIG. 2, imaginary lines extending along the aisles in the parking place 50 are defined as shown by long dashed short dashed lines, and the nodes are set on the imaginary lines so that the node positions are separated at the predetermined intervals.

For example, for straight sections of the aisles, a pair of nodes is set at the end points (start point and end point) of each straight section. These nodes are used for the autonomous vehicle 2 to automatically drive in the straight section. Additional nodes may be set in the section between the end points of the straight section of the aisle.

In the case where the entrances of the parking spaces 61 face the section between the end points of the straight section of the aisle, a node is set in front of each parking space 61, and an additional node is set on a frame line corresponding to the entrance of each parking space 61. These nodes are used for the automated valet parking system 100 to send information on the driving boundaries and landmark(s) around the parking space 61 to the autonomous vehicle 2 when the autonomous vehicle 2 automatically parks in the parking space 61. Additional nodes may be set around each parking space 61.

For curve sections of the aisles, each curve section is defined by nodes at the end points (the end points on the curve section side) of the adjacent straight sections with the curve section therebetween. For example, a pair of nodes that is the end points of the curve section of the aisle (nodes corresponding to the start and end points of the curve) may be the nodes at the end points of the adjacent straight sections described above. For the curve section of the aisle, the imaginary line can be defined as a curved line connecting these nodes. These nodes are used for the autonomous vehicle 2 to automatically drive in the curve section. An additional node(s) may be set in the section between the nodes at the end points of the adjacent straight sections (hereinafter also simply referred to as "in the curve section").

The parking place map information further includes node label information regarding the node types. The node label information means information given to each node in order to label the nodes with the node types. The node types means the types of positions of the nodes in the parking place 50. The node types include, e.g., a first node type, a second node type, and a third node type. The first node type refers to the nodes located near the parking sections, the second node type refers to the nodes located in the curve section, and the third node type refers to the nodes located in the straight section.

The predetermined intervals between the node positions are not necessarily the same in the entire parking place 50 and are preset according to the position of the node. For example, the interval between the nodes located near the parking sections (distance L1 in FIG. 2) is shorter than the interval between the nodes located in the curve or straight section that is not located near the parking spaces. The interval between the nodes located in the curve section may be shorter than the interval between the nodes located in the straight section. The interval between the nodes located in the curve section with a radius of curvature larger than a predetermined threshold may be equal to the interval between the nodes located in the straight section. The intervals between the nodes located in the straight section (distance L2 in FIG. 2) may be substantially the same in the straight section. The interval between the nodes located near the boundary with the curve section may be shorter than the interval between the nodes not located near the boundary with the curve section. The nodes located near the parking sections may be any nodes located near the parking sections and may be located in either a curved or straight aisle.

Regarding the position of the node, the curve section means a curve section not located near the parking sections, and the linear section means a straight section not located near the parking sections. The curve section may include a section where the traveling direction changes in an intersection.

The parking place map information includes aisle width information regarding the widths of the aisles in the parking place 50. The aisle widths are not necessarily the same in the entire parking place 50 and are preset according to the positions of the driving boundaries in the parking place 50. For example, the aisle width can be the distance on a road surface between a pair of driving boundaries in a direction perpendicular to the imaginary line extending substantially along the center of the aisle. The aisle width information is preset according to the positions of the driving boundaries placed according to the structure of the parking place 50. FIG. 2 illustrates an aisle width W1 and an aisle width W2. For the aisle width W1, a pair of pillars located next to the parking spaces 61 serves as the driving boundaries. The pillars face each other with an aisle interposed therebetween. For the aisle width W2, a wall and a pillar facing each other with an aisle, which is a straight section, interposed therebetween serve as the driving boundaries. In this example, the aisle width W1 is larger than the aisle width W2 in view of a back-and-forth maneuver of the autonomous vehicle 2 which may be performed in front of the parking space 61. The aisle width in the curve section may be larger than the aisle width in the straight section.

Figure 3:
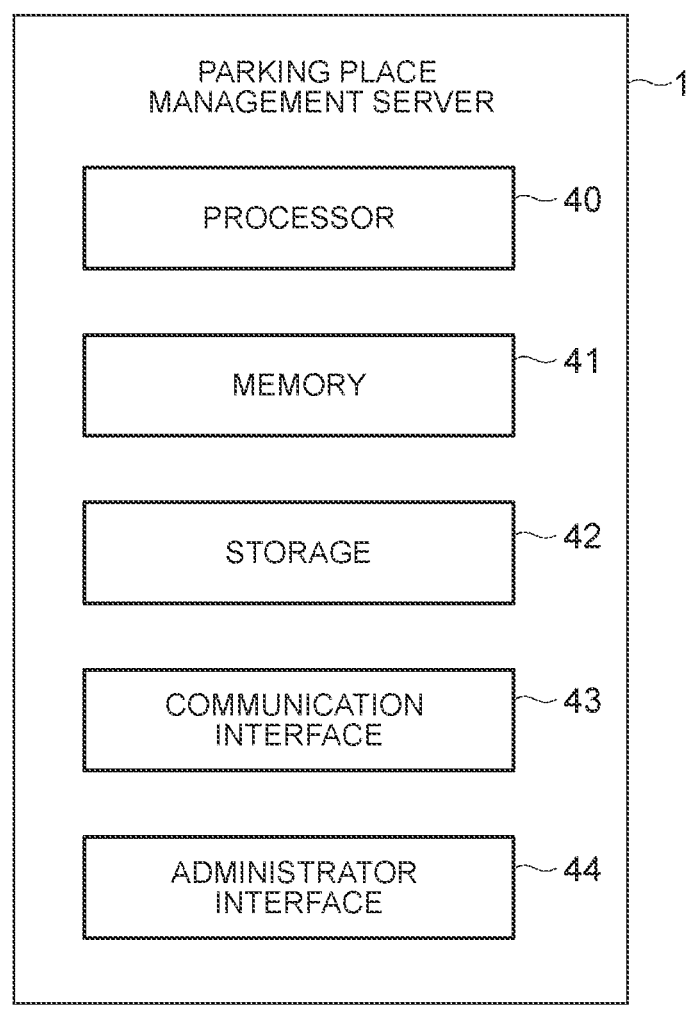
FIG. 3 is a block diagram illustrating an example of the hardware configuration of a parking place management server.

The hardware configuration of the parking place management server 1 will be described. FIG. 3 is a block diagram illustrating an example of the hardware configuration of the parking place management server 1. As shown in FIG. 3, the parking place management server 1 is configured as a general computer including a processor 40, a memory 41, a storage 42, a communication interface 43, and a user interface 44 (or an administrator interface 44).

The processor 40 operates various operating systems to control the parking place management server 1. The processor 40 is a computing unit such as a central processing unit (CPU) including a control device, a computing device, a register, etc. The processor 40 generally controls the memory 41, the storage 42, the communication interface 43, and the user interface 44. The memory 41 is a recording medium such as a read only memory (ROM) or a random access memory (RAM). The storage 42 is a recording medium such as a hard disk drive (HDD).

The communication interface 43 is a communication device for wireless communication via a network. The communication interface 43 can be a network device, a network controller, a network card, etc. The parking place management server 1 communicates with the autonomous vehicle 2 and the user frontend 3 using the communication interface 43. The user interface 44 is an input/output unit of the parking place management server 1 for an administrator etc. of the parking place management server 1. The user interface 44 includes an output device such as a display or a speaker and an input device such as a touch panel.

Next, the functional configuration of the parking place management server 1 will be described. As shown in FIG. 1, the parking place management server 1 includes a vehicle information acquisition unit (first vehicle position acquisition unit) 11, a vehicle state perception unit (second vehicle position acquisition unit) 12, a position error calculation unit 13, a position failure determination unit 14, and a vehicle instruction unit 15.

The vehicle information acquisition unit 11 acquires vehicle information of the autonomous vehicle 2 for automated valet parking by communication with the autonomous vehicle 2. The vehicle information includes identification information of the autonomous vehicle 2 and first vehicle position information of the autonomous vehicle 2 in the parking place. The first vehicle position information is information on a first vehicle position perceived by a vehicle position perception unit 33 of the autonomous vehicle 2 based on the detection result of an external sensor 22 of the autonomous vehicle 2. The first vehicle position is the position of the autonomous vehicle 2 on the parking place map. The identification information may be any information that can identify the individual autonomous vehicle 2. The identification information may be an identification (ID) number, a vehicle number, an automatic valet parking reservation number, etc.

The vehicle information may include the model of the autonomous vehicle 2 or may include the vehicle number besides the identification information. The vehicle information may include drop-off reservation information such as reserved drop-off time or may include scheduled pick-up time. The vehicle information may include vehicle body information such as the turning radius, overall length, and width of the autonomous vehicle 2 or may include information regarding an autonomous driving function of the autonomous vehicle 2. The information regarding the autonomous driving function may include version information of autonomous driving.

The vehicle information may include the perception results of the driving state of the autonomous vehicle 2 and the external environment. Perception of the driving state and the external environment will be described later. The vehicle information may include information on the available driving distance or the remaining fuel of the autonomous vehicle 2.

The vehicle information acquisition unit 11 continuously acquires the vehicle information from the autonomous vehicle 2 during automated valet parking. The vehicle information acquisition unit 11 may continuously acquire the vehicle information from a specific autonomous vehicle 2 that is automatically driving according to instructions during automated valet parking. In the case where an autonomous vehicle 2 different from the autonomous vehicle 2 is automatically driving according to instructions, the vehicle information acquisition unit 11 may continuously acquire the vehicle information from the different autonomous vehicle 2. Once the autonomous vehicle 2 is parked, the vehicle information acquisition unit 11 may stop acquiring the vehicle information or may periodically acquire the vehicle information.

The vehicle state perception unit 12 acquires a second vehicle position based on the detection result of the parking place sensor 4 installed in the parking place 50. The second vehicle position is the position of the autonomous vehicle 2 on the parking place map. The vehicle state perception unit 12 acquires the second vehicle position of the autonomous vehicle 2 on the parking place map based on the detection result of the vehicle position detection sensor that is the parking place sensor 4. The second vehicle position can be acquired using the parking place facility sensor, regardless of whether the external sensor 22 of the autonomous vehicle 2 is normal or abnormal. In the present disclosure, the second vehicle position is therefore used as a reference for calculating an error (position error) of the first vehicle position (described later) that is detected using the external sensor 22 of the autonomous vehicle 2.

The first vehicle position includes a first longitudinal position in the direction in which the aisle extends and a first lateral position in the lateral direction of the aisle. The first longitudinal position can be, e.g., a component of the first vehicle position in the direction in which the imaginary line (long dashed short dashed line) extends along the aisles in the parking place 50 in FIG. 2. The first lateral position can be, e.g., a component of the first vehicle position in the direction perpendicular to the imaginary line extending substantially along the center of the aisle.

The second vehicle position includes a second longitudinal position in the direction in which the aisle extends and a second lateral position in the lateral direction of the aisle. The second longitudinal position can be, e.g., a component of the second vehicle position in the direction in which the imaginary line extends along the aisles in the parking place 50 in FIG. 2. The second lateral position can be, e.g., a component of the second vehicle position in the direction perpendicular to the imaginary line extending substantially along the center of the aisle.

The vehicle state perception unit 12 may perceive the state of the autonomous vehicle 2 during automated valet parking, based on the vehicle information acquired by the vehicle information acquisition unit 11. The state of the autonomous vehicle 2 includes the vehicle positions of a plurality of autonomous vehicles 2 that is automatically driving.

The position error calculation unit 13 calculates a position error between the first vehicle position acquired by the vehicle information acquisition unit 11 and the second vehicle position acquired by the vehicle state perception unit 12. The position error means a deviation of the vehicle position of the autonomous vehicle 2. The deviation is used to determine a position failure of the autonomous vehicle 2. The position error includes a longitudinal position error in the direction in which the aisle extends and a lateral position error in the lateral direction of the aisle. The position error calculation unit 13 calculates the longitudinal position error and the lateral position error based on the acquired first and second vehicle positions. The longitudinal position error is the difference between the first and second longitudinal positions in the direction in which the aisle extends, and the lateral position error is the difference between the first and second lateral positions in the lateral direction of the aisle.

The position failure determination unit 14 determines whether there is a position failure, based on the first and second vehicle positions. The position failure means a failure in perceiving the vehicle position of the autonomous vehicle 2 regarding the first vehicle position based on the detection result of the external sensor 22. The position failure may be caused by, e.g., a failure of the external sensor 22 itself, a detection failure due to the external sensor 22 being physically blocked by foreign matter etc., a detection failure due to a landmark being physically covered by dirt etc., a communication error from the external sensor 22 to an autonomous driving ECU 20, etc.

The position failure determination unit 14 sets a determination threshold for determining whether there is a position failure. The determination threshold includes a longitudinal threshold that is used for the longitudinal position error and a lateral threshold that is used for the lateral position error.

In the present disclosure, the longitudinal threshold is smaller than the lateral threshold. For example, the autonomous vehicle 2 that moves in the parking place 50 may more frequently encounter a curve section that bends sharply (e.g., a curve section connecting straight sections intersecting at about 90°) in the parking place 50 as compared to ordinary roads etc. If the first vehicle position based on the external sensor 22 of the autonomous vehicle 2 includes a large position error in the direction in which the aisle extends when the autonomous vehicle 2 enters such a curve section, there is a large position error in the traveling direction of the autonomous vehicle 2 (direction along an extension of the straight section) in, e.g., the straight section immediately before the curve section. As a result, the autonomous vehicle 2 is more likely to contact an outer wall in the curve section located ahead in the traveling direction of the autonomous vehicle 2. In the case where the parking place 50 is a multi-story parking garage, there is also a large position error in the traveling direction of the autonomous vehicle 2 (direction along an extension of the straight section) in the straight section immediately before a ramp. As a result, the autonomous vehicle 2 is more likely to contact an outer wall in the ramp located ahead in the traveling direction of the autonomous vehicle 2 when the autonomous vehicle 2 moves along the ramp connecting the stories. In order to reduce the possibility of such contact between the autonomous vehicle 2 and the wall etc., the longitudinal threshold is made smaller than the lateral threshold. Sensitivity to position failure for the longitudinal position is thus increased, and an increase in longitudinal position error in localization of the autonomous vehicle 2 can be detected early.

When the width of the aisle along which the autonomous vehicle 2 is moving is equal to or larger than an aisle width threshold, the position failure determination unit 14 may determine whether there is a position failure using a larger lateral threshold than when the width of the aisle along which the autonomous vehicle 2 is moving is smaller than the aisle width threshold. The aisle width threshold is a threshold for changing the lateral threshold according to the width of the aisle along which the autonomous vehicle 2 is moving. For example, the position failure determination unit 14 determines whether the width of the aisle along which the autonomous vehicle 2 is moving is equal to or larger than the aisle width threshold. When the position failure determination unit 14 determines that the width of the aisle along which the autonomous vehicle 2 is moving is equal to or larger than the aisle width threshold, the position failure determination unit 14 sets the lateral threshold to a lateral threshold ThLT1. When the position failure determination unit 14 determines that the width of the aisle along which the autonomous vehicle 2 is moving is neither equal to nor larger than the aisle width threshold, the position failure determination unit 14 sets the lateral threshold to a lateral threshold ThLT2.

The lateral threshold ThLT1 is larger than the lateral threshold ThLT2. The magnitude of the aisle width corresponds to the distance between the driving boundaries located on both sides in the lateral direction of the autonomous vehicle 2. Accordingly, when the aisle width is small, the distance between the autonomous vehicle 2 and the driving boundaries tends to be small. The lateral threshold ThLT2 is therefore made smaller than the lateral threshold ThLT1. Sensitivity to position failure for the lateral position is thus increased, and the possibility of contact with the driving boundaries can be reduced.

When the node interval between adjacent nodes on the aisle along which the autonomous vehicle 2 is moving is equal to or larger than a node interval threshold, the position failure determination unit 14 may determine whether there is a position failure using a larger longitudinal threshold than when the node interval is smaller than the node interval threshold. The node interval threshold is a threshold for changing the longitudinal threshold according to the node interval between adjacent nodes on the aisle along which the autonomous vehicle 2 is moving. For example, the position failure determination unit 14 determines whether the node interval between adjacent nodes on the aisle along which the autonomous vehicle 2 is moving is equal to or larger than the node interval threshold. When the position failure determination unit 14 determines that the node interval between adjacent nodes on the aisle along which the autonomous vehicle 2 is moving is equal to or larger than the node interval threshold, the position failure determination unit 14 sets the longitudinal threshold to a longitudinal threshold ThLN1. When the position failure determination unit 14 determines that the node interval between adjacent nodes on the aisle along which the autonomous vehicle 2 is moving is neither equal to nor larger than the node interval threshold, the position failure determination unit 14 sets the longitudinal threshold to a longitudinal threshold ThLN2.

The longitudinal threshold ThLN1 is larger than the longitudinal threshold ThLN2. The magnitude of the node interval typically corresponds to the distance in the vehicle traveling direction by which the parking place management server 1 can control the autonomous vehicle 2. When the node interval is small, the distance between autonomous vehicles 2 moving close to each other tends to be small. The longitudinal threshold ThLN2 is therefore made smaller than the longitudinal threshold ThLN1. Sensitivity to position failure for the longitudinal position is thus increased, and the autonomous vehicles 2 are less likely to contact each other. The node interval is not limited to the interval in the direction along the imaginary line in FIG. 2, and may be a concentric distance from the position of the node near the autonomous vehicle 2.

When the nodes near the moving autonomous vehicle 2 are of the first node type (when the moving autonomous vehicle 2 is located near the parking sections), the position failure determination unit 14 sets the longitudinal threshold to a longitudinal threshold ThLN3. When the nodes near the moving autonomous vehicle 2 are of the second node type (when the moving autonomous vehicle 2 is located in the curve section), the position failure determination unit 14 sets the longitudinal threshold to a longitudinal threshold ThLN4. When the nodes near the moving autonomous vehicle 2 are of the third node type (when the moving autonomous vehicle 2 is located in the straight section), the position failure determination unit 14 sets the longitudinal threshold to a longitudinal threshold ThLN5.

The longitudinal threshold ThLN3 is smaller than the longitudinal threshold ThLN4. The distance between the autonomous vehicle 2 and the driving boundaries such as a pillar in the longitudinal direction of the autonomous vehicle 2 may be smaller near the parking sections than in the curve and straight sections due to the possibility of the autonomous vehicle 2 performing a back-and-forth maneuver in a desired parking space as described above. It is therefore important to reduce a deviation of the longitudinal position of the autonomous vehicle 2. The longitudinal threshold ThLN3 is therefore made smaller than the longitudinal threshold ThLN4. Sensitivity to position failure for the longitudinal position is thus increased, and an increase in longitudinal position error in localization of the autonomous vehicle 2 can be detected early.

The longitudinal threshold ThLN4 is smaller than the longitudinal threshold ThLN5. Unlike in the straight section, there may be an outer wall in the curve section in the longitudinal direction of the autonomous vehicle 2 (direction tangential to the curve section). In addition, there may be an oncoming autonomous vehicle 2 in the curve section. It is therefore important to reduce a deviation of the longitudinal position of the autonomous vehicle 2. The longitudinal threshold ThLN4 is therefore made smaller than the longitudinal threshold ThLN5. Sensitivity to position failure for the longitudinal position is thus increased, and the possibility of contact with the driving boundaries can be reduced.

In the case where there is another autonomous vehicle 2 in the longitudinal direction of the autonomous vehicle 2, the distance to the another autonomous vehicle 2 is substantially constant when the relative vehicle speed is low, but the distance to the another autonomous vehicle 2 may decrease when the vehicle speed relative to the another autonomous vehicle 2 is equal to or higher than a certain speed. It is therefore important to reduce a deviation of the longitudinal position of the autonomous vehicle 2. When there is another autonomous vehicle 2 moving ahead or behind the autonomous vehicle 2 and the vehicle speed relative to the another autonomous vehicle 2 is equal to or higher than a predetermined relative vehicle speed threshold, the position failure determination unit 14 may determine whether there is a position failure using a longitudinal threshold ThLN6. The longitudinal threshold ThLN6 is smaller than a longitudinal threshold ThLN7 that is used when the vehicle speed relative to the another autonomous vehicle 2 is lower than the relative vehicle speed threshold. The vehicle speed relative to the another autonomous vehicle 2 may be a relative vehicle speed that is positive when the distance to the another autonomous vehicle 2 decreases. The relative vehicle speed threshold is a threshold of the relative vehicle speed for switching the longitudinal threshold according to the vehicle speed relative to the another autonomous vehicle 2 moving ahead or behind the autonomous vehicle 2.

The position failure determination unit 14 determines whether the nodes near the moving autonomous vehicle 2 are of the first node type to determine whether the moving autonomous vehicle 2 is located near the parking sections. However, the position failure determination unit 14 may determine whether the distance along a desired route from the node closest to the moving autonomous vehicle 2 to the node of a desired parking space is equal to or smaller than a predetermined threshold. Alternatively, the position failure determination unit 14 may determine whether the linear distance from the node closest to the moving autonomous vehicle 2 to the node of the desired parking space is equal to or smaller than a predetermined threshold (whether the node of the desired parking space is included in a circle about the node closest to the moving autonomous vehicle 2 having a radius of the predetermined threshold).

The position failure determination unit 14 determines that there is a position failure when the difference between the first and second longitudinal positions (longitudinal position error) is equal to or larger than the longitudinal threshold or when the difference between the first and second lateral positions (lateral position error) is equal to or larger than the lateral threshold.

For example, the position failure determination unit 14 determines whether the longitudinal position error is equal to or larger than the longitudinal threshold. The position failure determination unit 14 determines whether the lateral position error is equal to or larger than the lateral threshold. When the position failure determination unit 14 determines that the longitudinal position error is equal to or larger than the longitudinal threshold or when the position failure determination unit 14 determines that the lateral position error is equal to or larger than the lateral threshold, the position failure determination unit 14 determines that there is a position failure. When the position failure determination unit 14 determines that the longitudinal position error is neither equal to nor larger than the longitudinal threshold and determines that the lateral position error is neither equal to nor larger than the lateral threshold, the position failure determination unit 14 determines that there is no position failure.

The vehicle instruction unit 15 gives instructions to the autonomous vehicle 2 that performs automatic valet parking. The vehicle instruction unit 15 provides a desired route to a desired parking space for the autonomous vehicle 2 when the autonomous vehicle 2 starts automatic valet parking. The method for determining the desired parking space is not particularly limited. The autonomous vehicles 2 may be assigned to the parking spaces from the exit side in order of entry into the parking place, or may be assigned to the parking spaces from the exit side in order of scheduled pick-up time, starting with the earliest. The user may designate a desired parking space. The vehicle instruction unit 15 need not necessarily provide the entire desired route from the current position of the autonomous vehicle 2 to the desired parking space at a time, and may provide a part of the desired route at a time. The vehicle instruction unit 15 provides a desired route to the pick-up space 63 when the user picks the autonomous vehicle 2 up.

The vehicle instruction unit 15 calculates the desired route from the position of the autonomous vehicle 2 to the desired parking space, based on the vehicle position of the autonomous vehicle 2 that is automatically moving according to instructions. The vehicle position is the position acquired by the vehicle information acquisition unit 11. For example, the vehicle instruction unit 15 calculates, as the desired route, the shortest travel distance route to the desired parking space along the driving aisle in the parking place. The vehicle instruction unit 15 may calculate a new desired route for the autonomous vehicle 2. The new desired route does not cross a desired route for another autonomous vehicle 2. The vehicle instruction unit 15 may determine the desired parking space in view of the desired route. The vehicle instruction unit 15 may provide an upper vehicle speed limit in the parking place together with the desired route. The vehicle instruction unit 15 may provide an upper acceleration limit. The upper vehicle speed limit and the upper acceleration limit are predetermined.

The vehicle instruction unit 15 gives a stop instruction and a drive instruction according to the state of another autonomous vehicle 2 perceived by the vehicle state perception unit 12. The stop instruction is an instruction to stop the autonomous vehicle 2. The drive instruction is an instruction to move (start) the stopped autonomous vehicle 2. The vehicle instruction unit 15 may give an instruction about deceleration or acceleration of the autonomous vehicle 2. The vehicle instruction unit 15 controls the autonomous vehicle 2 so that the autonomous vehicle 2 stops and moves according to the state of the another autonomous vehicle 2. The vehicle instruction unit 15 thus causes the autonomous vehicle 2 to move to the desired parking space while avoiding approaching the another autonomous vehicle 2.

When the position failure determination unit 14 determines that there is a position failure, the vehicle instruction unit 15 may give a stop instruction to the autonomous vehicle 2. When the position failure determination unit 14 determines that there is a position failure, the vehicle instruction unit 15 may give a deceleration instruction to the autonomous vehicle 2. When the position failure determination unit 14 determines that there is no position failure, the vehicle instruction unit 15 may give a drive instruction to the autonomous vehicle 2. When the position failure determination unit 14 determines that there is no position failure, the vehicle instruction unit 15 may give an acceleration instruction to the autonomous vehicle 2.

In the case where a LIDAR is installed as the parking place sensor 4 at a predetermined position in the parking place 50, the vehicle instruction unit 15 may instruct the autonomous vehicle 2 to move to a position near the installation position of the LIDAR when the position failure determination unit 14 determines that there is a position failure. In this case, the result of localization by the vehicle position perception unit 33 of the autonomous vehicle 2 can be corrected by correcting the detection result of the external sensor 22 (landmark position information), which has caused the position failure, using the detection result of the LIDAR serving as the parking place sensor 4. The result of localization by the vehicle position perception unit 33 of the autonomous vehicle 2 can also be corrected by sending position information detected by the vacancy sensor to the autonomous vehicle 2 located near the parking space 61 using the detection results of the vacancy sensors provided for each parking space (parking slot) 61.

Next, the autonomous vehicle 2 and the user frontend 3 will be described. The autonomous vehicle 2 and the user frontend 3 communicate with the parking place management server 1. The automated valet parking system 100 according to the present embodiment does not need to include the autonomous vehicle 2 and the user frontend 3.

As shown in FIG. 1, the autonomous vehicle 2 includes, e.g., the autonomous driving ECU 20. The autonomous driving ECU 20 is an electronic control unit including a CPU, a ROM, a RAM, etc. The autonomous driving ECU 20 implements various functions by, e.g., loading a program recorded on the ROM into the RAM and causing the CPU to execute the program loaded into the RAM. The autonomous driving ECU 20 may be composed of a plurality of electronic units.

The autonomous driving ECU 20 is connected to a communication unit 21, the external sensor (on-board sensor) 22, an internal sensor 23, and an actuator 24.

The communication unit 21 is a communication device that controls wireless communication with the outside of the autonomous vehicle 2. The communication unit 21 sends and receives various kinds of information by communicating with the parking place management server 1. For example, the communication unit 21 sends vehicle information to the parking place management server 1 and acquires information necessary for automated valet parking (e.g., information on a landmark located along the desired route) from the parking place management server 1. The communication unit 21 also communicates with the user frontend 3 associated with the autonomous vehicle 2.

The external sensor 22 is an on-board sensor that detects the external environment of the autonomous vehicle 2. The external sensor 22 includes at least an on-board camera. The on-board camera is an imaging device that captures an image of the external environment of the autonomous vehicle 2. For example, the on-board camera is mounted on the back side of a windshield of the autonomous vehicle 2 and captures an image of an area ahead of the autonomous vehicle 2. The on-board camera sends the captured image information regarding the external environment of the autonomous vehicle 2 to the autonomous driving ECU 20. The on-board camera may be either a monocular camera or a stereo camera. A plurality of on-board cameras may be mounted to capture images of areas on both sides of the autonomous vehicle 2 and behind the autonomous vehicle 2 in addition to the area ahead of the autonomous vehicle 2.

The external sensor 22 may include an on-board radar sensor. The on-board radar sensor detects an object by transmitting radio waves or light to the area around the autonomous vehicle 2 and receiving the radio waves or light reflected by the object. The on-board radar sensor includes, e.g., a millimeter wave radar or a LIDAR. The on-board radar sensor sends the detected object information to the autonomous driving ECU 20. The external sensor 22 may include a sonar sensor that detects sound outside the autonomous vehicle 2.

The internal sensor 23 is an on-board sensor that detects the driving state of the autonomous vehicle 2. The internal sensor 23 includes a vehicle speed sensor, an acceleration sensor, and a yaw rate sensor. The vehicle speed sensor is a detector that detects the speed of the autonomous vehicle 2. The vehicle speed sensor can be a wheel speed sensor mounted on wheels of the autonomous vehicle 2, drive shafts that rotate with the wheels, or the like. The wheel speed sensor detects the rotational speed of each wheel. The vehicle speed sensor sends the detected vehicle speed information (wheel speed information) to the autonomous driving ECU 20.

The acceleration sensor is a detector that detects the acceleration of the autonomous vehicle 2. The acceleration sensor includes, e.g., a longitudinal acceleration sensor that detects the acceleration in the longitudinal direction of the autonomous vehicle 2. The acceleration sensor may include a lateral acceleration sensor that detects the lateral acceleration of the autonomous vehicle 2. For example, the acceleration sensor sends acceleration information of the autonomous vehicle 2 to the autonomous driving ECU 20. The yaw rate sensor is a detector that detects the yaw rate (rotational angular velocity) about the vertical axis of the center of gravity of the autonomous vehicle 2. The yaw rate sensor can be, e.g., a gyro sensor. The yaw rate sensor sends the detected yaw rate information of the autonomous vehicle 2 to the autonomous driving ECU 20.

The actuator 24 is a device that is used to control the autonomous vehicle 2. The actuator 24 includes at least a drive actuator, a brake actuator, and a steering actuator. The drive actuator controls air supply to an engine (throttle valve opening degree) according to a control signal from the autonomous driving ECU 20 to control the driving force of the autonomous vehicle 2. In the case where the autonomous vehicle 2 is a hybrid vehicle, the control signal from the autonomous driving ECU 20 is applied to a motor that is a power source to control the driving force of the autonomous vehicle 2 in addition to the air supply to the engine. In the case where the autonomous vehicle 2 is an electric vehicle, the control signal from the autonomous driving ECU 20 is applied to a motor that is a power source to control the driving force of the autonomous vehicle 2. In these cases, the motor that is a power source constitutes the actuator 24.

The brake actuator controls a brake system according to a control signal from the autonomous driving ECU 20 to control the braking force that is applied to the wheels of the autonomous vehicle 2. The brake system can be, e.g., a hydraulic brake system. The steering actuator controls driving of an assist motor of an electric power steering system according to a control signal from the autonomous driving ECU 20. The assist motor is a motor that controls steering torque. The steering actuator thus controls the steering torque of the autonomous vehicle 2.

Next, an example of the functional configuration of the autonomous driving ECU 20 will be described. The autonomous driving ECU 20 includes an external environment perception unit 31, a driving state perception unit 32, the vehicle position perception unit 33, a vehicle information providing unit 34, and a vehicle control unit 35.

The external environment perception unit 31 perceives the external environment of the autonomous vehicle 2 based on the detection result of the external sensor 22 (the image captured by the on-board camera or the object information detected by the on-board radar sensor). The external environment includes the position of an object located around the autonomous vehicle 2 relative to the autonomous vehicle 2. The external environment may include the speed of the object located around the autonomous vehicle 2 relative to the autonomous vehicle 2 and the direction in which the object moves relative to the autonomous vehicle 2. The external environment perception unit 31 perceives objects such as other vehicles and pillars in the parking place by pattern matching etc. The external environment perception unit 31 may perceive a gate of the parking place, walls of the parking place, poles, safety cones, etc. The external environment perception unit 31 may also perceive the driving boundaries in the parking place by perceiving white lines.

The driving state perception unit 32 perceives the driving state of the autonomous vehicle 2 based on the detection result of the internal sensor 23. The driving state includes the vehicle speed of the autonomous vehicle 2, the acceleration of the autonomous vehicle 2, and the yaw rate of the autonomous vehicle 2. Specifically, the driving state perception unit 32 perceives the vehicle speed of the autonomous vehicle 2 based on the vehicle speed information from the vehicle speed sensor. The driving state perception unit 32 perceives the acceleration of the autonomous vehicle 2 based on the vehicle speed information from the acceleration sensor. The driving state perception unit 32 perceives the orientation of the autonomous vehicle 2 based on the yaw rate information from the yaw rate sensor.

The vehicle position perception unit 33 acquires the first vehicle position, which is the position of the autonomous vehicle 2 on the parking place map, based on the detection result of the external sensor 22 of the autonomous vehicle 2 and the parking place map information including the position information of the landmarks in the parking place 50. The vehicle position perception unit 33 acquires the first vehicle position by estimating the vehicle position that is the position of the autonomous vehicle 2 on the parking place map (localization).

As used herein, localization means estimating the vehicle position of the autonomous vehicle 2 on the parking place map using the position information of the landmarks on the parking place map. The vehicle position perception unit 33 detects a landmark, the position of which on the parking place map is predetermined using the external sensor 22 by a well-known method, and uses the landmark for localization. For example, the vehicle position perception unit 33 acquires the first vehicle position by perceiving the position of the landmark relative to the autonomous vehicle 2 based on the external environment perceived by the external environment perception unit 31 and the position information of the landmark acquired from the parking place management server 1 via the communication unit 21.

The vehicle position perception unit 33 may perceive the position of the autonomous vehicle 2 by dead reckoning based on the detection result of the internal sensor 23. The vehicle position perception unit 33 may perceive the position of the autonomous vehicle 2 by communicating with a beacon installed in the parking place.

The vehicle information providing unit 34 provides the vehicle information to the parking place management server 1 via the communication unit 21. For example, the vehicle information providing unit 34 provides the vehicle information including information on the position of the autonomous vehicle 2 in the parking place to the parking place management server 1. The position of the autonomous vehicle 2 is perceived by the vehicle position perception unit 33 at regular time intervals.

The vehicle control unit 35 performs autonomous driving of the autonomous vehicle 2. In the autonomous driving, the autonomous vehicle 2 automatically moves along a desired route provided by the parking place management server 1. The vehicle control unit 35 generates a trajectory of the autonomous vehicle 2 based on, e.g., the desired route, the position of the autonomous vehicle 2, the external environment of the autonomous vehicle 2, and the driving state of the autonomous vehicle 2. The trajectory corresponds to a driving plan for autonomous driving. The trajectory includes a path along which the vehicle moves during autonomous driving and a vehicle speed plan for autonomous driving.

The path is a path on the desired route along which the vehicle is going to move during autonomous driving. The path can be, e.g., data on how the steering angle of the autonomous vehicle 2 changes according to the positions on the desired route (steering angle plan). The positions on the desired route are, e.g., set longitudinal positions set at predetermined intervals (e.g., every 1 m) in the traveling direction on the desired route. The steering angle plan is data on desired steering angles associated with each set longitudinal position.

The vehicle control unit 35, for example, generates a trajectory so that the autonomous vehicle 2 moves along the center of the driving aisle in the parking place along the desired route. In the case where the parking place management server 1 has provided the upper vehicle speed limit, the vehicle control unit 35 generates a trajectory having a vehicle speed plan that does not become higher than the upper vehicle speed limit. The vehicle control unit 35 may generate a trajectory using the parking place map information acquired by communication with the parking place management server 1.

The vehicle control unit 35 stops the autonomous vehicle 2 in response to a stop instruction from the parking place management server 1. The vehicle control unit 35 moves the stopped autonomous vehicle 2 in response to a drive instruction from the parking place management server 1. The vehicle control unit 35 performs, e.g., vehicle longitudinal control and vehicle lateral control to cause the autonomous vehicle 2 to automatically move along the path. Although an example of the configuration of the autonomous vehicle 2 is described above, the autonomous vehicle 2 is not limited to the above configuration as long as automated valet parking can be implemented.

The user frontend 3 is a user's mobile information terminal associated with the autonomous vehicle 2. For example, the user frontend 3 is registered in the autonomous vehicle 2 as a terminal of the owner of the autonomous vehicle 2. The user frontend 3 may be a terminal of the user registered in the autonomous vehicle 2 as a temporary owner renting the autonomous vehicle 2 or as an authorized person to whom the authority to give instructions to the autonomous vehicle 2 has been transferred from the owner of the autonomous vehicle 2. For example, the user frontend 3 is composed of a computer including a processor such as a CPU, a memory such as a ROM or a RAM, and a user interface including a touch panel serving also as a display etc.

The user frontend 3 has a function to send a drop-off request and a pick-up request to the parking place management server 1. The user can send a drop-off request and a pick-up request for automatic valet parking by operating the user frontend 3. For example, the user gives the authority to give instructions to the autonomous vehicle 2 to the parking place management server 1 by operating the user frontend 3 to complete the drop-off request after stopping and leaving the autonomous vehicle 2 in the drop-off space 62 in the drop-off area 52 of the parking place 50.

In response to a pick-up request from the user, the autonomous vehicle 2 parked in the parking space 61 is moved to the pick-up space 63 in the pick-up area 53 via the parking place management server 1. The autonomous vehicle 2 waits for the user in the pick-up space 63. For example, the parking place management server 1 terminates the authority to give instructions to the autonomous vehicle 2 when the autonomous vehicle 2 reaches and stops in the pick-up space 63. The parking place management server 1 may terminate the authority to give instructions to the autonomous vehicle 2 when the user instructs the autonomous vehicle 2 to open its door(s) or to start. The autonomous vehicle 2 may terminate the authority to give instructions to the autonomous vehicle 2. The operation of the autonomous vehicle 2 in response to the drop-off request and the pick-up request is not limited to the operation in the manner described above. The same applies to the parking place management server 1.

Processing of Automated Valet Parking System

Figure 4:
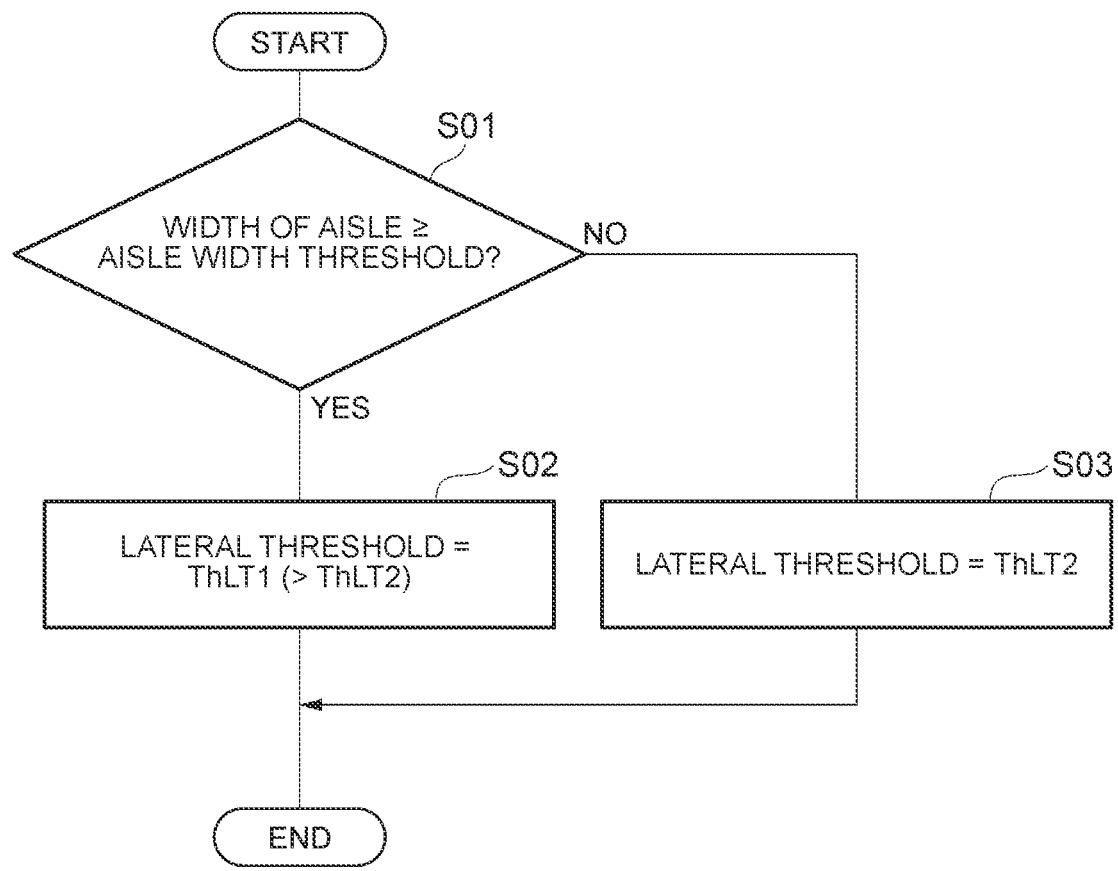
FIG. 4 is a flowchart illustrating an example of a lateral threshold setting process.

Next, processing of the automated valet parking system 100 will be described with reference to the drawings. FIG. 4 is a flowchart illustrating an example of a lateral threshold setting process. The lateral threshold setting process of FIG. 4 is performed after the start of automated valet parking such as, e.g., when the autonomous vehicle 2 capable of communicating with the parking place management server 1 enters the parking place.

As shown in FIG. 4, the position failure determination unit 14 of the parking place management server 1 determines in S01 whether the width of the aisle along which the autonomous vehicle 2 is moving is equal to or larger than the aisle width threshold.

When the position failure determination unit 14 of the parking place management server 1 determines that the width of the aisle along which the autonomous vehicle 2 is moving is equal to or larger than the aisle width threshold (S01: YES), the routine proceeds to S02. When the position failure determination unit 14 of the parking place management server 1 determines that the width of the aisle along which the autonomous vehicle 2 is moving is neither equal to nor larger than the aisle width threshold (S01: NO), the routine proceeds to S03.

In S02, the position failure determination unit 14 of the parking place management server 1 sets the lateral threshold to the lateral threshold ThLT1. The lateral threshold ThLT1 is larger than the lateral threshold ThLT2 to which the lateral threshold is set when the width of the aisle along which the autonomous vehicle 2 is moving is smaller than the aisle width threshold. In S03, the position failure determination unit 14 of the parking place management server 1 sets the lateral threshold to the lateral threshold ThLT2. The current process of FIG. 4 is then terminated. The parking place management server 1 repeatedly performs the process of FIG. 4, e.g., a predetermined time after the termination of the process of FIG. 4.

Figure 5:
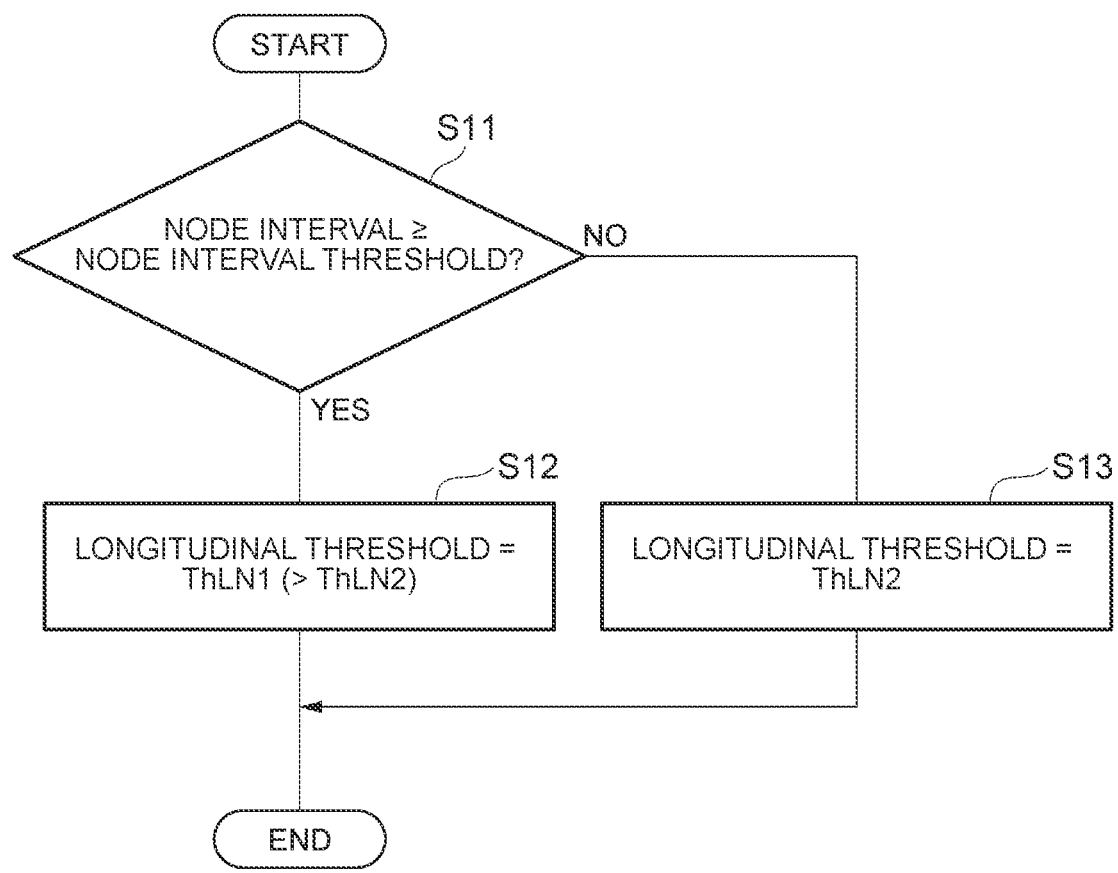
FIG. 5 is a flowchart illustrating an example of a longitudinal threshold setting process.

FIG. 5 is a flowchart illustrating an example of a longitudinal threshold setting process. The longitudinal threshold setting process of FIG. 5 is performed after the start of automated valet parking such as, e.g., when the autonomous vehicle 2 capable of communicating with the parking place management server 1 enters the parking place.

As shown in FIG. 5, the position failure determination unit 14 of the parking place management server 1 determines in S11 whether the node interval between adjacent nodes on the aisle along which the autonomous vehicle 2 is moving is equal to or larger than the node interval threshold.

When the position failure determination unit 14 of the parking place management server 1 determines that the node interval between adjacent nodes on the aisle along which the autonomous vehicle 2 is moving is equal to or larger than the node interval threshold (S11: YES), the routine proceeds to S12. When the position failure determination unit 14 of the parking place management server 1 determines that the node interval between adjacent nodes on the aisle along which the autonomous vehicle 2 is moving is neither equal to nor larger than the node interval threshold (S11: NO), the routine proceeds to S13.

In S12, the position failure determination unit 14 of the parking place management server 1 sets the longitudinal threshold to the longitudinal threshold ThLN1. The longitudinal threshold ThLN1 is larger than the longitudinal threshold ThLN2 to which the longitudinal threshold is set when the node interval between adjacent nodes on the aisle along which the autonomous vehicle 2 is moving is smaller than the node interval threshold. In S13, the position failure determination unit 14 of the parking place management server 1 sets the longitudinal threshold to the longitudinal threshold ThLN2. The current process of FIG. 5 is then terminated. The parking place management server 1 repeatedly performs the process of FIG. 5, e.g., a predetermined time after the termination of the process of FIG. 5.

Figure 6:
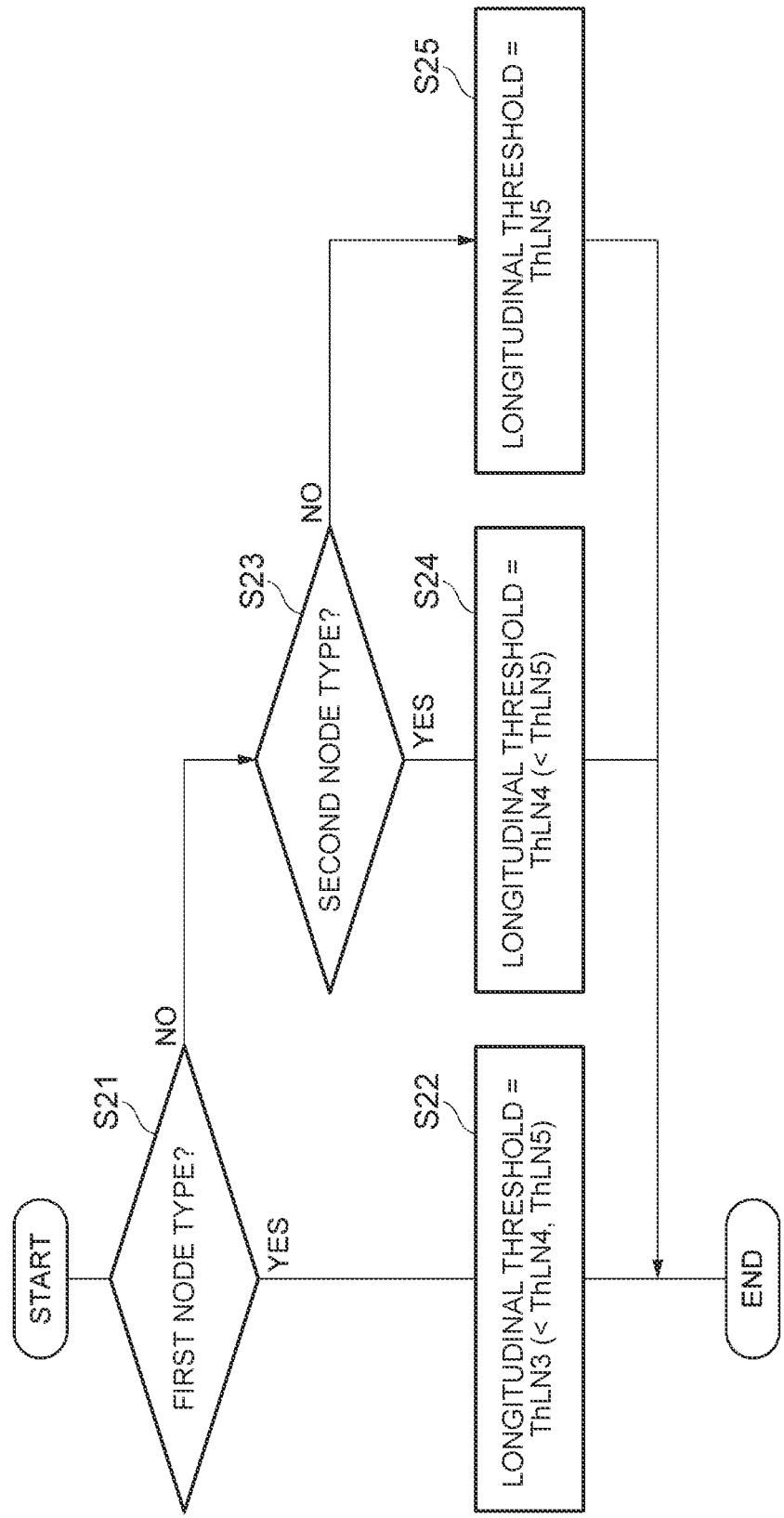
FIG. 6 is a flowchart illustrating another example of the longitudinal threshold setting process.

The longitudinal threshold may be set as shown in FIG. 6. FIG. 6 is a flowchart illustrating another example of the longitudinal threshold setting process. The longitudinal threshold setting process of FIG. 6 is performed after the start of automated valet parking such as, e.g., when the autonomous vehicle 2 capable of communicating with the parking place management server 1 enters the parking place.

As shown in FIG. 6, the position failure determination unit 14 of the parking place management server 1 determines in S21 whether the node label is the first node type (whether the node is located near the parking sections). When the position failure determination unit 14 of the parking place management server 1 determines that the node label is the first node type (S21: YES), the routine proceeds to S22. In S22, the position failure determination unit 14 of the parking place management server 1 sets the longitudinal threshold to the longitudinal threshold ThLN3. The longitudinal threshold ThLN3 is smaller than the longitudinal threshold ThLN4 or ThLN5 to which the longitudinal threshold is set when the nodes near the moving autonomous vehicle 2 are of the second node type or the third node type, respectively. The current process of FIG. 6 is then terminated. The parking place management server 1 repeatedly performs the process of FIG. 6, e.g., a predetermined time after the termination of the process of FIG. 6.

On the other hand, when the position failure determination unit 14 of the parking place management server 1 determines that the node label is not the first node type (S21: NO), the routine proceeds to S23. In S23, the position failure determination unit 14 of the parking place management server 1 determines whether the node label is the second node type (whether the node is located in the curve section). When the position failure determination unit 14 of the parking place management server 1 determines that the node label is the second node type (S23: YES), the routine proceeds to S24. In S24, the position failure determination unit 14 of the parking place management server 1 sets the longitudinal threshold to the longitudinal threshold ThLN4. The longitudinal threshold ThLN4 is smaller than the longitudinal threshold ThLN5 to which the longitudinal threshold is set when the nodes near the moving autonomous vehicle 2 are of the third node type. The current process of FIG. 6 is then terminated. The parking place management server 1 repeatedly performs the process of FIG. 6, e.g., a predetermined time after the termination of the process of FIG. 6.

On the other hand, when the position failure determination unit 14 of the parking place management server 1 determines that the node label is not the second node type (S23: NO), the routine proceeds to S25. In S25, the position failure determination unit 14 of the parking place management server 1 sets the longitudinal threshold to the longitudinal threshold ThLN5. The longitudinal threshold ThLN5 is the longitudinal threshold to which the longitudinal threshold is set when the nodes near the moving autonomous vehicle 2 are of the third node type. The current process of FIG. 6 is then terminated. The parking place management server 1 repeatedly performs the process of FIG. 6, e.g., a predetermined time after the termination of the process of FIG. 6.

Figure 7:
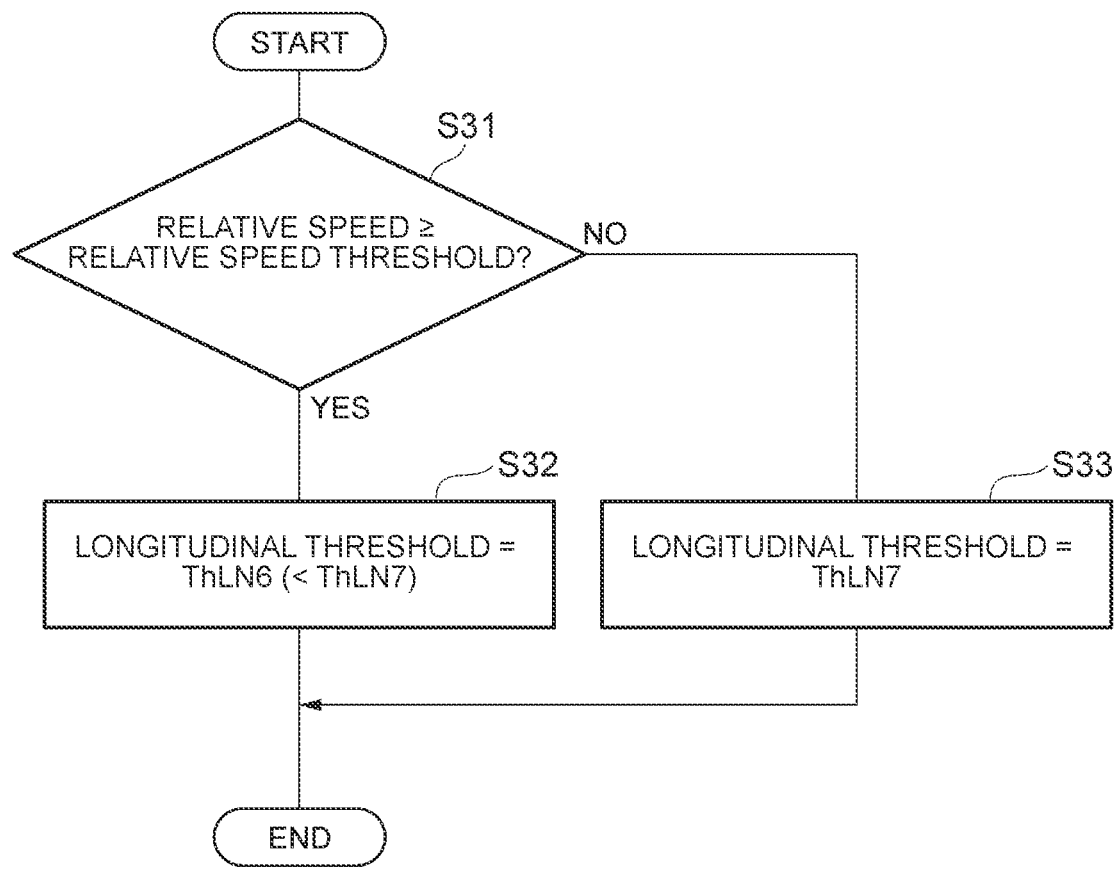
FIG. 7 is a flowchart illustrating still another example of the longitudinal threshold setting process.

Alternatively, the longitudinal threshold may be set as shown in FIG. 7. FIG. 7 is a flowchart illustrating still another example of the longitudinal threshold setting process. For example, the longitudinal threshold setting process of FIG. 7 is performed when there is another autonomous vehicle 2 moving ahead or behind the autonomous vehicle 2 after the start of automated valet parking.

As shown in FIG. 7, the position failure determination unit 14 of the parking place management server 1 determines in S31 whether the vehicle speed of the autonomous vehicle 2 relative to the another autonomous vehicle 2 is equal to or higher than the predetermined relative vehicle speed threshold.

When the position failure determination unit 14 of the parking place management server 1 determines that the vehicle speed of the autonomous vehicle 2 relative to the another autonomous vehicle 2 is equal to or higher than the predetermined relative vehicle speed threshold (S31: YES), the routine proceeds to S32. When the position failure determination unit 14 of the parking place management server 1 determines that the vehicle speed of the autonomous vehicle 2 relative to the another autonomous vehicle 2 is neither equal to nor higher than the predetermined relative vehicle speed threshold (S31: NO), the routine proceeds to S33.

In S32, the position failure determination unit 14 of the parking place management server 1 sets the longitudinal threshold to the longitudinal threshold ThLN6. The longitudinal threshold ThLN6 is smaller than the longitudinal threshold ThLN7 to which the longitudinal threshold is set when the vehicle speed of the autonomous vehicle 2 relative to the another autonomous vehicle 2 is lower than the predetermined relative vehicle speed threshold. In S33, the position failure determination unit 14 of the parking place management server 1 sets the longitudinal threshold to the longitudinal threshold ThLN7. The current process of FIG. 7 is then terminated. The parking place management server 1 repeatedly performs the process of FIG. 7 when there is another autonomous vehicle 2 moving ahead or behind the autonomous vehicle 2, e.g., a predetermined time after the termination of the process of FIG. 7.

Figure 8:
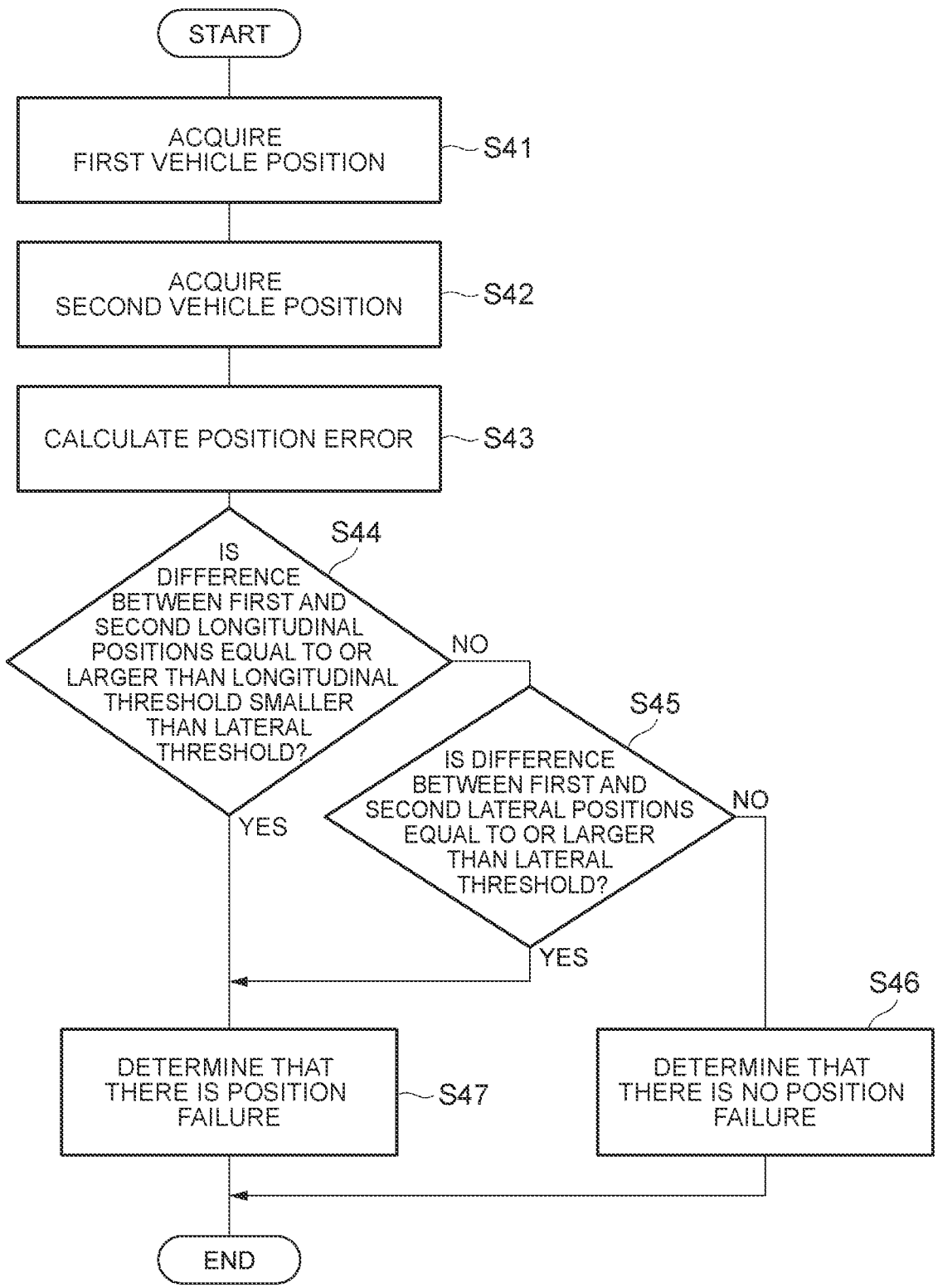
FIG. 8 is a flowchart illustrating an example of a position failure determination process.

FIG. 8 is a flowchart illustrating an example of a position failure determination process. The position failure determination process is performed after the start of automated valet parking such as, e.g., when the autonomous vehicle 2 capable of communicating with the parking place management server 1 enters the parking place.

As shown in FIG. 8, in S41, the vehicle information acquisition unit 11 of the parking place management server 1 acquires the first vehicle position of the autonomous vehicle 2. The first vehicle positon is perceived by the vehicle position perception unit 33 of the autonomous vehicle 2 based on the detection result of the external sensor 22 of the autonomous vehicle 2 that is automatically moving according to instructions. In S42, the vehicle state perception unit 12 of the parking place management server 1 acquires the second vehicle position, which is the position of the autonomous vehicle 2 on the parking place map, based on the detection result of the parking place sensor 4 installed in the parking place 50.

In S43, the position error calculation unit 13 of the parking place management server 1 calculates the position error between the acquired first and second vehicle positions. For example, the position error calculation unit 13 calculates the longitudinal position error, which is the difference between the first and second longitudinal positions in the direction in which the aisle extends, and the lateral position error, which is the difference between the first and second lateral positions in the lateral direction of the aisle, based on the acquired first and second vehicle positions.

In S44, the position failure determination unit 14 of the parking place management server 1 determines whether the difference between the first and second longitudinal positions (longitudinal position error) is equal to or larger than the longitudinal threshold that is smaller than the lateral threshold.

When the position failure determination unit 14 of the parking place management server 1 determines that the longitudinal position error is neither equal to nor larger than the longitudinal threshold (S44: NO), the routine proceeds to S45. In S45, the position failure determination unit 14 of the parking place management server 1 determines whether the difference between the first and second lateral positions (lateral position error) is equal to or larger than the lateral threshold. When the position failure determination unit 14 of the parking place management server 1 determines that the lateral position error is neither equal to nor larger than the lateral threshold (S45: NO), the routine proceeds to S46. In S46, the position failure determination unit 14 of the parking place management server 1 determines that there is no position failure. The current process of FIG. 8 is then terminated. The parking place management server 1 repeatedly performs the process of FIG. 8, e.g., a predetermined time after the termination of the process of FIG. 8.

On the other hand, when the position failure determination unit 14 of the parking place management server 1 determines that the longitudinal position error is equal to or larger than the longitudinal threshold (S44: YES) or when the position failure determination unit 14 of the parking place management server 1 determines that the lateral position error is equal to or larger than the lateral threshold (S45: YES), the routine proceeds to S47. In S47, the position failure determination unit 14 of the parking place management server 1 determines that there is a position failure. The current process of FIG. 8 is then terminated. The parking place management server 1 repeatedly performs the process of FIG. 8, e.g., a predetermined time after the termination of the process of FIG. 8.

According to the automated valet parking system 100 of the embodiment described above, it is determined that there is a position failure when the difference between the first and second longitudinal positions is equal to or larger than the longitudinal threshold or the difference between the first and second lateral positions is equal to or larger than the lateral threshold. The longitudinal threshold (any one of ThLN1 to ThLN5) smaller than the lateral threshold (ThLT1 or ThLT2) is used to determine whether there is a position failure. Accordingly, whether there is a position failure in the first vehicle position can be appropriately determined regarding the direction in which the aisle extends.

According to the automated valet parking system 100, the parking place map information includes the aisle width information regarding the widths of the aisles. When the width of the aisle along which the autonomous vehicle 2 is moving is equal to or larger than the aisle width threshold, the position failure determination unit 14 determines whether there is a position failure using the lateral threshold ThLT1 larger than the lateral threshold ThLT2 that is used when the width of the aisle along which the autonomous vehicle 2 is moving is smaller than the aisle width threshold. Whether there is a position failure in the lateral position can thus be appropriately determined according to the aisle width.

According to the automated valet parking system 100, the parking place map information includes the node position information regarding the nodes that are preset for the aisles so as to be separated at the predetermined intervals. When the node interval between adjacent nodes on the aisle along which the autonomous vehicle 2 is moving is equal to or larger than the node interval threshold, the position failure determination unit 14 determines whether there is a position failure using the longitudinal threshold ThLN1 larger than the longitudinal threshold ThLN2 that is used when the node interval is smaller than the node interval threshold. Whether there is a position failure in the longitudinal position can thus be determined according to the node interval.

According to the automated valet parking system 100, the parking place map information further includes the node position information regarding the nodes that are preset for the aisles so as to be separated at the predetermined intervals and the node label information regarding the node types. The node label information includes the node type indicating that the node is located near the parking sections. When the nodes near the moving autonomous vehicle 2 are located near the parking sections, the position failure determination unit 14 determines whether there is a position failure using the longitudinal threshold ThLN3 smaller than the longitudinal thresholds ThLN4, ThLN5 that are used when the node is not located near the parking sections. Whether there is a position failure in the longitudinal position can thus be determined according to whether the node is located near the parking sections.

Although the embodiment of the disclosure is described above, the disclosure is not limited to the above embodiment. The disclosure can be implemented in various modified or improved forms based on the knowledge of those skilled in the art, in addition to the above embodiment.

The parking place management server 1 does not have to be directly communicable with the autonomous vehicle 2, and may communicate with the autonomous vehicle 2 via other server etc. The parking place management server 1 may communicate with the autonomous vehicle 2 via, e.g., a management server of the manufacturer of the autonomous vehicle 2 or an operation server of Mobility as a Service (Maas).

The first node type indicating that the node is located near the parking spaces, the second node type indicating that the node is located in the curve section, and the third node type indicating that the node is located neither near the parking spaces nor in the curve section are shown as the node types. However, one or two of these three node types may be omitted, or other node type(s) may further be included. Alternatively, the parking place map information need not necessarily include the node label information regarding the node types.

In the above embodiment, the position information of the driving boundaries and the position information of the landmarks are associated in advance with the nodes and stored as node information in the parking place map database 5. However, such node information need not necessarily be stored in the parking place map database 5. For example, the position information of the driving boundaries and the position information of the landmarks which are associated in advance with the nodes may be obtained as the node information from a provider different from the parking place map database 5 (e.g., a map data production company etc.) and such node information may be used.

In the above embodiment, the longitudinal threshold is set by one of the longitudinal threshold setting processes of FIGS. 5 to 7. However, the longitudinal threshold may be set by a combination of at least two of the longitudinal threshold setting processes of FIGS. 5 to 7. In this case, for example, the longitudinal threshold set by the longitudinal threshold setting process of FIG. 6 may be corrected by the longitudinal threshold setting process of FIG. 5. In this case, when the nodes near the moving autonomous vehicle 2 are of the same type (that is, the type specified by the determination processes of S21 and S22 of FIG. 6), the longitudinal threshold can be corrected to a more appropriate longitudinal threshold according to the relationship between the node interval and the node interval threshold determined in S11 of FIG. 5. Similarly, for example, the longitudinal threshold set in the longitudinal threshold setting process of FIG. 6 may be corrected by the longitudinal threshold setting process of FIG. 7. In this case, when the nodes near the moving autonomous vehicle 2 are of the same type (that is, the type specified by the determination processes of S21 and S22 of FIG. 6), the longitudinal threshold can be corrected to a more appropriate longitudinal threshold according to the relationship between the relative speed and the relative speed threshold determined in S31 of FIG. 7.

The longitudinal threshold need not necessarily be set according to the aisle width, the node type, and the relative speed. In the above embodiment, the lateral threshold is set by the lateral threshold setting process of FIG. 4. However, the lateral threshold need not necessarily be set according to the aisle width. In short, according to the present disclosure, the longitudinal threshold need only be smaller than the lateral threshold in any case.

In the above embodiment, the position failure determination unit 14 determines that there is a position failure when one of the following two conditions is satisfied, the condition that the difference between the first and second longitudinal positions is equal to or larger than the longitudinal threshold and the condition that the difference between the first and second lateral positions is equal to or larger than the lateral threshold. However, the position failure determination unit 14 may determine that there is a position failure when both of the conditions are satisfied. That is, the position failure determination unit 14 may determine that there is a position failure in at least one of a case where the difference between the first and second longitudinal positions is equal to or larger than the longitudinal threshold and a case where the difference between the first and second lateral positions is equal to or larger than the lateral threshold.

What is claimed is:

1. An automated valet parking system configured to instruct an autonomous vehicle in a parking place to automatically move along an aisle in the parking place and park in a desired parking space in the parking place, the automated valet parking system comprising:
   a first vehicle position acquisition unit configured to acquire a first vehicle position that is a position of the autonomous vehicle on a parking place map based on a detection result of an on-board sensor of the autonomous vehicle and parking place map information including object information in the parking place;
   a second vehicle position acquisition unit configured to acquire a second vehicle position that is a position of the autonomous vehicle on the parking place map based on a detection result of a facility sensor installed in the parking place, the facility sensor configured to detect a location of the autonomous vehicle in the parking place; and
   a position failure determination unit configured to determine whether a position failure about the first vehicle position of the autonomous vehicle is based on the first vehicle position and the second vehicle position, wherein:
      the first vehicle position includes a first longitudinal position along an extending direction in which the aisle extends and a first lateral position along a lateral direction of the aisle;
      the second vehicle position includes a second longitudinal position along the extending direction and a second lateral position along the lateral direction of the aisle;
      the position failure determination unit is configured to determine that the position failure is in at least one of a case where a difference between the first longitudinal position and the second longitudinal position is equal to or larger than a longitudinal threshold, and a case where a difference between the first lateral position and the second lateral position is equal to or larger than a lateral threshold; and
      the longitudinal threshold is smaller than the lateral threshold.

2. The automated valet parking system according to claim 1, wherein:
   the parking place map information includes aisle width information regarding a width of the aisle;
   the position failure determination unit is configured to determine whether the position failure is by using a first lateral threshold as the lateral threshold when a width of the aisle along which the autonomous vehicle is moving is equal to or larger than an aisle width threshold; and
   the first lateral threshold is larger than a second lateral threshold that is used when the width of the aisle along which the autonomous vehicle is moving is smaller than the aisle width threshold.

3. The automated valet parking system according to claim 1, wherein:
   the parking place map information includes node position information regarding a plurality of nodes that is preset for a plurality of the aisles so as to be separated at predetermined intervals;
   the position failure determination unit is configured to determine whether the position failure is by using a first longitudinal threshold as the longitudinal threshold when a node interval between the nodes on the aisle along which the autonomous vehicle is moving is equal to or larger than a node interval threshold; and
   the first longitudinal threshold is larger than a second longitudinal threshold that is used when the node interval is smaller than the node interval threshold.

4. The automated valet parking system according to claim 1, wherein:
   the parking place map information includes node position information regarding a plurality of nodes that is preset for a plurality of the aisles so as to be separated at predetermined intervals and node label information regarding types of the nodes;
   the node label information includes a node type indicating that a node is located near a parking section;
   the position failure determination unit is configured to determine whether the position failure is by using a first longitudinal threshold as the longitudinal threshold when the node near the moving autonomous vehicle is located near the parking section; and
   the first longitudinal threshold is smaller than a second longitudinal threshold that is used when the node is not located near the parking section.

5. An automated valet parking system comprising a controller configured to:
   instruct an autonomous vehicle in a parking place to automatically move along an aisle in the parking place and park in a desired parking space in the parking place;
   acquire a first vehicle position that is a position of the autonomous vehicle on a parking place map based on a detection result of an on-board sensor of the autonomous vehicle and parking place map information including object information in the parking place;
   acquire a second vehicle position that is a position of the autonomous vehicle on the parking place map based on a detection result of a facility sensor installed in the parking place, the facility sensor configured to detect a location of the autonomous vehicle in the parking place; and
   determine whether a position failure about the first vehicle position of the autonomous vehicle is based on the first vehicle position and the second vehicle position, wherein:
      the first vehicle position includes a first longitudinal position along an extending direction in which the aisle extends and a first lateral position along a lateral direction of the aisle;
      the second vehicle position includes a second longitudinal position along the extending direction and a second lateral position along the lateral direction of the aisle;
      the controller is configured to determine that the position failure is in at least one of a case where a difference between the first longitudinal position and the second longitudinal position is equal to or larger than a longitudinal threshold, and a case where a difference between the first lateral position and the second lateral position is equal to or larger than a lateral threshold; and
      the longitudinal threshold is smaller than the lateral threshold.

6. The automated valet parking system according to claim 5, wherein:

the parking place map information includes aisle width information regarding a width of the aisle;

the controller is configured to determine whether the position failure is by using a first lateral threshold as the lateral threshold when the width of the aisle along which the autonomous vehicle is moving is equal to or larger than an aisle width threshold; and the first lateral threshold is larger than a second lateral threshold that is used when the width of the aisle along which the autonomous vehicle is moving is smaller than the aisle width threshold.

7. The automated valet parking system according to claim 5, wherein:

the parking place map information includes node position information regarding a plurality of nodes that is preset for a plurality of the aisles so as to be separated at predetermined intervals;

the controller is configured to determine whether the position failure is by using a first longitudinal threshold as the longitudinal threshold when a node interval between the nodes on the aisle along which the autonomous vehicle is moving is equal to or larger than a node interval threshold; and the first longitudinal threshold is larger than a second longitudinal threshold that is used when the node interval is smaller than the node interval threshold.

8. The automated valet parking system according to claim 5, wherein:

the parking place map information includes node position information regarding a plurality of nodes that is preset for a plurality of the aisles so as to be separated at predetermined intervals and node label information regarding types of the nodes;

the node label information includes a node type indicating that a node is located near a parking section;

the controller is configured to determine whether the position failure is by using a first longitudinal threshold as the longitudinal threshold when the node near the moving autonomous vehicle is located near the parking section; and the first longitudinal threshold is smaller than a second longitudinal threshold that is used when the node is not located near the parking section.

9. The automated valet parking system according to claim 1, wherein the facility sensor is configured to detect whether the parking space in the parking place is occupied and/or empty.

10. The automated valet parking system according to claim 5, wherein the facility sensor is configured to detect whether the parking space in the parking place is occupied and/or empty.

* * * * *